(12) United States Patent
Putra et al.

(10) Patent No.: US 11,461,603 B2
(45) Date of Patent: Oct. 4, 2022

(54) SENSOR OF IMAGING DEVICE DETECTS AN AMOUNT OF PRINT MEDIA IN A PRINT MEDIA RECEPTACLE USING PLURAL THRESHOLDS TO NOTIFY USER WHEN THE IMAGING DEVICE HAS A LOW QUANTITY OF THE PRINT MEDIA

(71) Applicant: Hewlett-Packard Development Company, L.P., Spring, TX (US)

(72) Inventors: Martinus Raditya Putra, Singapore (SG); Ban Ho Chong, Singapore (SG); Jun Hong Goh, Singapore (SG); Shiok Lin Jasmine Tay, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,045

(22) PCT Filed: Oct. 1, 2018

(86) PCT No.: PCT/US2018/053715
§ 371 (c)(1),
(2) Date: Dec. 30, 2020

(87) PCT Pub. No.: WO2020/072029
PCT Pub. Date: Apr. 9, 2020

(65) Prior Publication Data
US 2021/0365753 A1    Nov. 25, 2021

(51) Int. Cl.
*B41J 11/00* (2006.01)
*G06K 15/00* (2006.01)
*G03G 15/00* (2006.01)

(52) U.S. Cl.
CPC ....... *G06K 15/4065* (2013.01); *B41J 11/0075* (2013.01); *B41J 11/0095* (2013.01); *G03G 15/607* (2013.01); *G03G 15/6535* (2013.01); *G03G 2215/00911* (2013.01)

(58) Field of Classification Search
None
See application file for complete search history.

(56) References Cited

U.S. PATENT DOCUMENTS

| | | | |
|---|---|---|---|
| 5,991,556 A | * | 11/1999 | Yamashita ............... B65H 3/44 271/9.03 |
| 6,574,013 B1 | | 6/2003 | Koshi |
| 9,731,520 B2 | | 8/2017 | Matsui |
| 2003/0202202 A1 | | 10/2003 | Miyata |
| 2008/0124096 A1 | | 5/2008 | Wada |

(Continued)

*Primary Examiner* — Haris Sabah
(74) *Attorney, Agent, or Firm* — Brooks Cameron & Huebsch PLLC

(57) ABSTRACT

In some examples, a non-transitory machine readable medium can include instructions executable by a processing resource to assert a low print media level notification responsive to determination that a first amount of print media in a media receptacle of an imaging device is less than a set value, detect a second amount of print media in the media receptacle of the imaging device, compare the detected second amount of print media to a print media threshold that is based on the set value and a selectable print media value, and maintain the low print media level notification responsive to a determination that the detected second amount of print media is less than the print media threshold.

11 Claims, 6 Drawing Sheets

(56) References Cited

U.S. PATENT DOCUMENTS

| | | |
|---|---|---|
| 2008/0201374 A1 | 8/2008 | Oya |
| 2010/0066005 A1 | 3/2010 | Ueda |
| 2012/0230709 A1* | 9/2012 | Sakaguchi ......... G03G 15/0856 399/27 |
| 2015/0005925 A1 | 1/2015 | Ogawa et al. |
| 2015/0061218 A1 | 3/2015 | Takitani et al. |
| 2016/0274852 A1* | 9/2016 | Katabami ............. G06F 3/1296 |
| 2016/0279990 A1 | 9/2016 | Kanetoku |
| 2017/0087883 A1* | 3/2017 | Matsui ..................... B41J 29/46 |
| 2017/0277986 A1* | 9/2017 | Hanamura ......... G06K 15/4065 |
| 2018/0348687 A1* | 12/2018 | Arai ................... G03G 15/6508 |
| 2019/0030934 A1* | 1/2019 | Arakane ............. B41J 2/17546 |

\* cited by examiner

SENSOR OF IMAGING DEVICE DETECTS AN AMOUNT OF PRINT MEDIA IN A PRINT MEDIA RECEPTACLE USING PLURAL THRESHOLDS TO NOTIFY USER WHEN THE IMAGING DEVICE HAS A LOW QUANTITY OF THE PRINT MEDIA

BACKGROUND

Imaging devices, such as printers and scanners, may be used for transferring print data on to a medium, such as paper, by a non-impact process. The print data may include, for example, a picture or text or a combination thereof and may be received from a computing device. The imaging device may have an image-forming assembly, such as a printhead, to form an image or text on the medium by precisely delivering small volumes of a printing substance on to the medium. For instance, the printing substance can be a printing fluid, such as ink, in case of a two-dimensional (2D) printer and can be build material in case of a three-dimensional (3D) printer.

DETAILED DESCRIPTION

Figure 1:
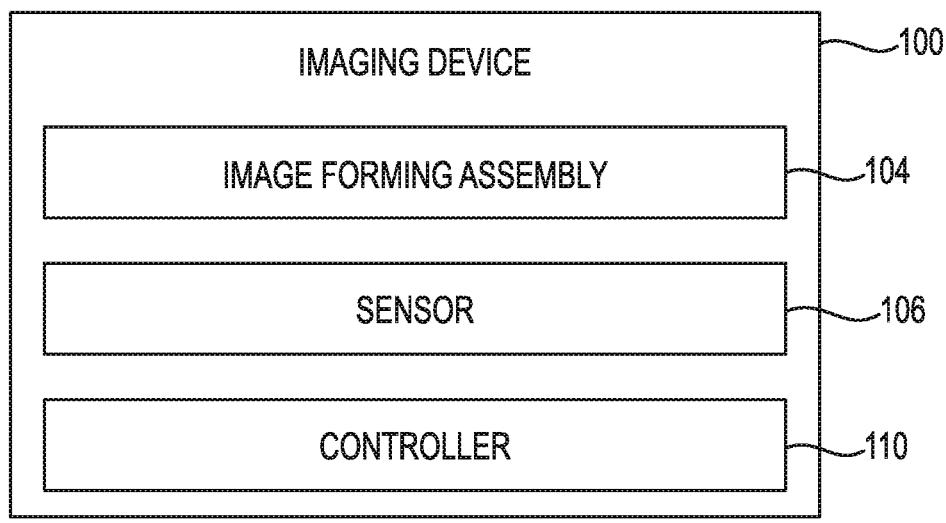
FIG. 1 illustrates a schematic of an imaging device suitable with print media thresholds, according to an example.

A media receptacle can provide a source of print media that can be conveyed to an image-forming assembly of an imaging device. An amount of print media in a media receptacle can change. For example, an amount of print in a media receptacle can decrease through operation of the imaging device such as printing or other operation of an imaging device. Conversely, an amount of print media included in a media receptacle can increase due to addition of print media (by a user or otherwise) to the media receptacle.

A sensor can sense such actual decreases or increases in an amount of print media. Examples of sensors include infrared (IR) sensors and optical distance sensors such as optical distance sensor employed in combination with a mechanical flag or other indicator, among other suitable sensors to detect an amount of print media.

For instance, a sensor in an imaging device can detect an amount of print media (e.g., a stack height of print media) to notify a user when the imaging device has a lower quantity of print media. That is, a given amount of print media in a print media receptacle can have an associated notification such as a low print media notification and/or a normal print media level notification. As used herein, a low print media level notification refers to text, numbers, characters, symbols and/or other information to indicate an amount of print media is less than a set value. Conversely, as used herein, a normal print media level notification refers to text, numbers, characters, symbols and/or other information to indicate an amount of print media is greater than a print media threshold. A low print media notification and/or a normal print media notification can be provided via visual, audio, haptic and/or other mechanism. For instance, a low print media notification and/or a normal media notification can be provided via graphical user interface (GUI) of an imaging device and/or via a GUI of a computing component (e.g., a monitor) coupled to the imaging device, among other possibilities.

As mentioned, sensors can detect actual changes in an amount of print media in a media receptacle. However, a sensor can inadvertently sense a "false" change in an amount of print media, even when an actual amount of print media in a media receptacle has not changed. For instance, a sensor can sense a "false" change due to variations in optical qualities between different types of print media, a presence of air between print media, imperfections in print media, and/or signal oscillations of the sensor, among other possibilities. An imaging device including the sensor experiencing the "false" change can fluctuate between asserting and de-asserting a signal providing for the presence and absence of a notification such as a low print media level notification. Such "false" changes and resultant fluctuations in a presence and an absence of notification (e.g., a low print media level notification and/or a normal print media level notifications) which can detract from a user experience.

As such, the disclosure is directed to print media thresholds. For example, print media thresholds can include a medium storing instructions executable to assert a low print media level notification responsive to a determination that a first amount of print media in a media receptacle of an imaging device is less than a set value, detect a second amount of print media in the media receptacle of the imaging device, compare the second amount of print media to a print media threshold that is based on a set value and a selectable print media value, and maintain the low print media level notification responsive to the determination that the detected second amount of print media is less than the print media threshold, as described herein. Notably, print media thresholds can mitigate/negate fluctuations in a presence and an absence of a notification (e.g., a low print media level notification and/or a normal print media level notification), as detailed herein. Moreover, a selectable print media value can permit customized print media thresholds.

FIG. 1 illustrates a schematic of an imaging device suitable with print media thresholds, according to an example. Examples of an imaging device 100 include, but are not limited to, printers, scanners, copiers, fax machines, and the like. As mentioned, the imaging device 100 can recreate digital content, such as text, images, and/or pictures, on a print media by transferring print substance onto the print media.

The imaging device 100 can be part of a network environment to cooperate and obtain imaging requests along with digital content for the imaging requests. The imaging device 100 can detect via a sensor an amount of print media in media receptacle (not illustrated) to indicate to a user regarding an estimated amount of the print media remaining in the media receptacle, as described herein.

The imaging device 100 can include a body portion (not illustrated) to house various components of the imaging device 100. The imaging device 100 can also include an image forming assembly 104. The image forming assembly 104 can be a printhead, among other types of image forming assemblies. The imaging device 100 can include an input roller assembly (not illustrated) or other conveyance mechanism (such as gravity and/or air pressure) to transport print media towards the image-forming assembly 104.

The imaging device 100 can include a sensor 106. The sensor 106 can be an IR sensors and/or optical distance sensors such as optical distance sensor employed in combination with a mechanical flag or other indicator, among other suitable types of sensors to detect an amount of print media. The imaging device 100 can include a controller 110 such as those controllers described herein in greater detail with respect to FIG. 5.

Figure 2A:
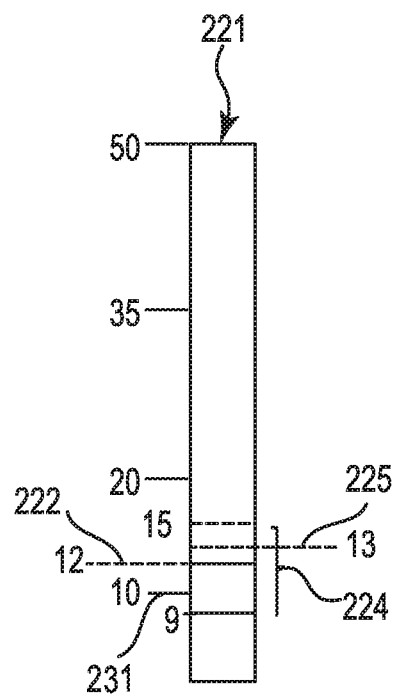
FIG. 2A illustrates a representation of a first amount of print media included in an imaging device, according to an example.

FIG. 2A illustrates a representation 221 of a first amount of print media 225 (i.e., a detected first amount of print media) included in an imaging device, according to an example. As illustrated in FIG. 2A, the representation 221 can be in form of a bar graph, though the disclosure is not so limited. An imaging device can display none, some, or all aspects of a representation such as representation 221. Regardless, an imaging device can display notifications such as normal print media level notifications and/or low print media level notifications, as detailed herein. Similarly, an imaging device can display a numerical or other representation of an estimated amount of print media included in the imaging device. An estimated amount of print media is equal to a detected amount of print media but may or may not be equal to an actual amount of print media, as detailed herein.

As used herein, "sheets" refers to sheets of print media. For instance, as illustrated in FIG. 2A, a first amount of print media 225 can be 13 sheets. However, an amount of print media detected by a sensor can vary over a period of time, even though an actual amount of print media remains constant for the period of time. For instance, signal oscillation or other variance can cause a sensor to detect different amounts of print media, irrespective of any change to an actual amount of print media. For instance, in an example with an actual amount of print media 222 is 12 sheets a sensor with a signal variance of 3 sheets can detect values in a range 224 extending from a lower limit of 9 sheets to an upper limit of 15 sheets, as illustrated in FIG. 2A.

A set value (e.g., a low level threshold) can be set at a factory or point of origin of an imaging device. That is, a set value 231 can be non-selectable value. A non-selectable value refers to a value that is not selectable by an end user of an imaging device. Though, in some examples the set value 231 can be selectable by an end user of an imaging device. As illustrated in FIG. 2A, a set value 231 can be 10 sheets. In such examples, the lower limit of 9 sheets in the range 224 is less than the set value 231 of 10 sheets. As such, a low print media level notification can be provided, as described herein. Conversely, a notification such as a normal print media level notification can be provided when a detected amount of print media is greater than a set value such as set value 231.

Figure 2B:
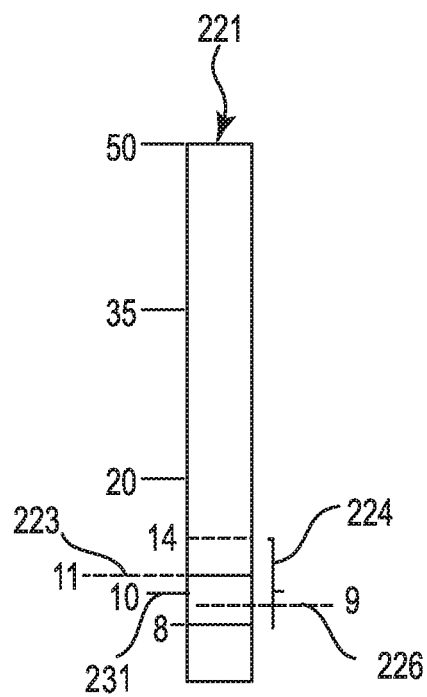
FIG. 2B illustrates a representation of a second amount of print media included in an imaging device, according to an example.

FIG. 2B illustrates a representation 221 of a second amount of print media 226 (i.e., a detected second amount of print media) included in an imaging device, according to an example. As illustrated in FIG. 2B, the second amount of print media 226 can be 9 sheets, among other possible values within range 224 which can extend from an upper limit of 14 to a lower limit of 8 sheets, among other possible values.

As mentioned, an actual amount of print media can vary. For instance, an actual amount of print media 223 can be 11 sheets after generation of 1 sheet by the imaging device. So, even though the second amount of print media of 9 sheets is not equal to the actual amount of print media 223, the imaging device can provide a low print media level notification. Thus, a user of the imaging device can be notified that the imaging device has a low amount of print media (an amount of print media below a set value 231 of 10 sheets). However, as some values (e.g., 11, 12, 13, 14 within the range 224 are above the set value of 10 sheets, the imaging device can de-assert a signal or otherwise can cause the low print media level notification to cease. For instance, in some examples the instructions can to de-assert a low print media level notification responsive to a determination that a detected second amount of print media is greater than a print media threshold. In any case, such notification fluctuations can distract a user or otherwise diminish a user experience. As such, FIGS. 3A, 3B, 4A, and 4B describe further aspects to mitigate/negate notification fluctuations.

Figure 3A:
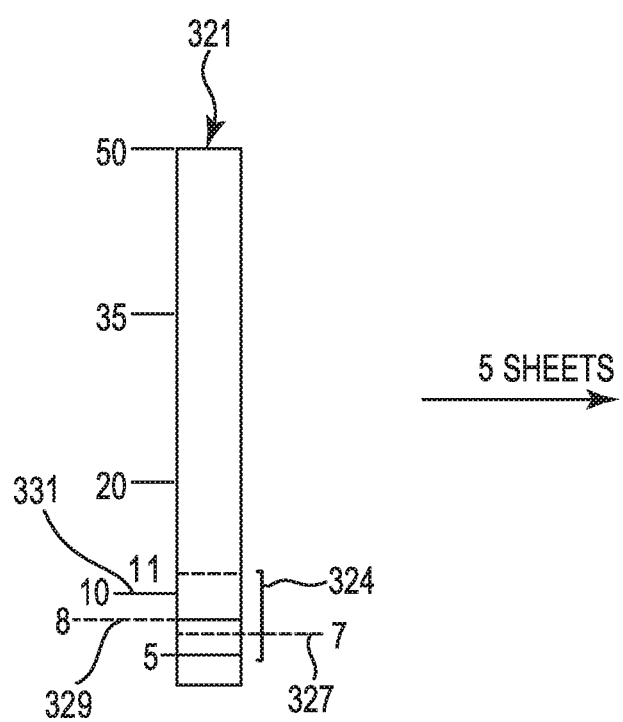
FIG. 3A illustrates another representation of a first amount of print media included in an imaging device, according to an example.

FIG. 3A illustrates another representation 321 of a first amount of print media 327 included in an imaging device, according to an example. As illustrated in FIG. 3A, a first amount of print media 327 can be equal to 7 sheets. However, an actual amount of print media 329 included in a media receptacle can be 8 sheets. As mentioned, a sensor can provide range a of detected amounts of print media. In the examples where the actual amount of print media is 8 sheets, a sensor can return values in range 324 extending from a lower limit of 5 sheets to an upper limit of 11 sheets, as illustrated in FIG. 3A, among other possibilities. For instance, as illustrated in FIG. 3A a first amount of print media 327 can be 7 sheets. As such, a low print media notification can be asserted (7 sheets is less than a set value 331 of 10 sheets).

Figure 3B:
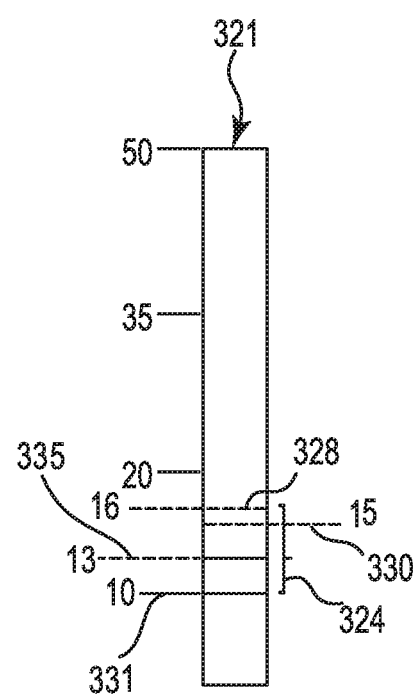
FIG. 3B illustrates another representation of a second amount of print media included in an imaging device, according to an example.

FIG. 3B illustrates another representation 321 of a second amount of print media 328 (i.e., a detected second amount of print media) included in an imaging device, according to an example. As illustrated in FIG. 3B, the second amount of print media 328 can be 16 sheets (which is within range 324 extending from a lower limit of 10 to an upper limit of 16), as illustrated in FIG. 3B. However, an actual amount of print media 335, for instance after insertion (by a user or otherwise) of 5 sheet of print media can be 13 sheets. Thus, the imaging device can provide a normal print media level notification (responsive to the second amount of print media 328 being greater than the print media threshold 330 of 15). Thus, a user of the imaging device can be notified that the imaging device has a normal amount of print media. However, it is noted that if an amount of print media is less than the print media threshold 330 a low print media level notification can be maintained or otherwise provided, even the amount of print media is greater than the set value 331 of 10 sheets, as described in greater detail with respect to FIG. 4B.

Figure 4A:
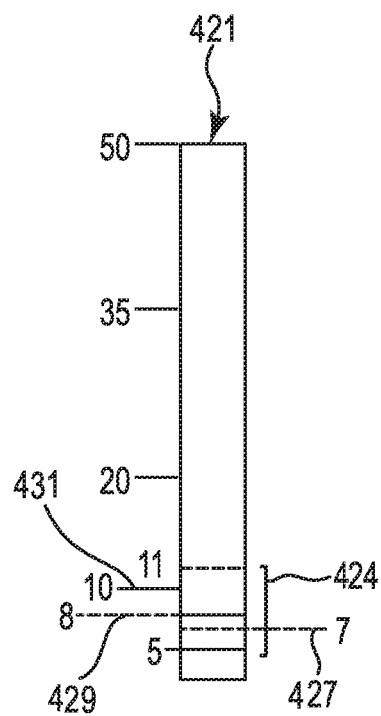
FIG. 4A illustrates yet another representation of a first amount of print media included in an imaging device, according to an example.

FIG. 4A illustrates yet another representation 421 of a first amount of print media 427 (i.e., a detected first amount of print media) included in an imaging device, according to an example. FIG. 4A is analogous or similar to FIG. 3A. For instance, an actual amount of print media 429 included in media receptacle can be 8 sheets. In such examples, a sensor with a variance of 3 sheets can have a range 424 extending from a lower limit of 5 to an upper limit of 11 sheets. In such examples, a sensor can detect the first amount of print media 427 as being 7 sheets, as illustrated in FIG. 4A, among other possibilities.

Figure 4B:
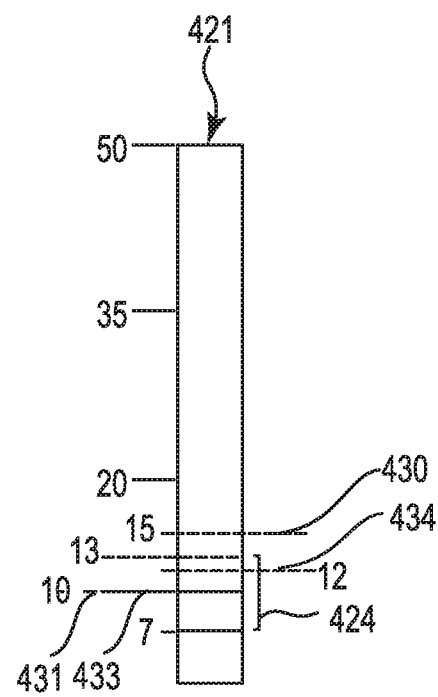
FIG. 4B illustrates yet another representation of a second amount of print media included in an imaging device, according to an example.

FIG. 4B illustrates yet another representation 421 of a second amount of print media 434 (i.e., a detected second amount of print media) included in an imaging device, according to an example. As illustrated in FIG. 4B, the imaging device can have second amount of print media 434 of 12 sheets which is within range 424 extending from a lower limit of 7 to an upper limit of 13, as illustrated in FIG. 4B. However, an actual amount of print media 433, for instance after insertion (by a user or otherwise) of 2 sheet of print media in the imaging device can be 10 sheets. So, although the second amount of print media of 12 sheets is not reflective of an actual amount of print media, the imaging device can maintain a low print media level notification (as the second amount of print media of 12 sheets is less than a print media threshold 430 of 15 sheets). Thus, a user of the imaging device can be notified that the imaging device has a low amount of print media. Stated differently, low print media level notification can be maintained or otherwise provided, even though the amount of print media is greater than a set value 431 of 10 sheets.

Figure 5:
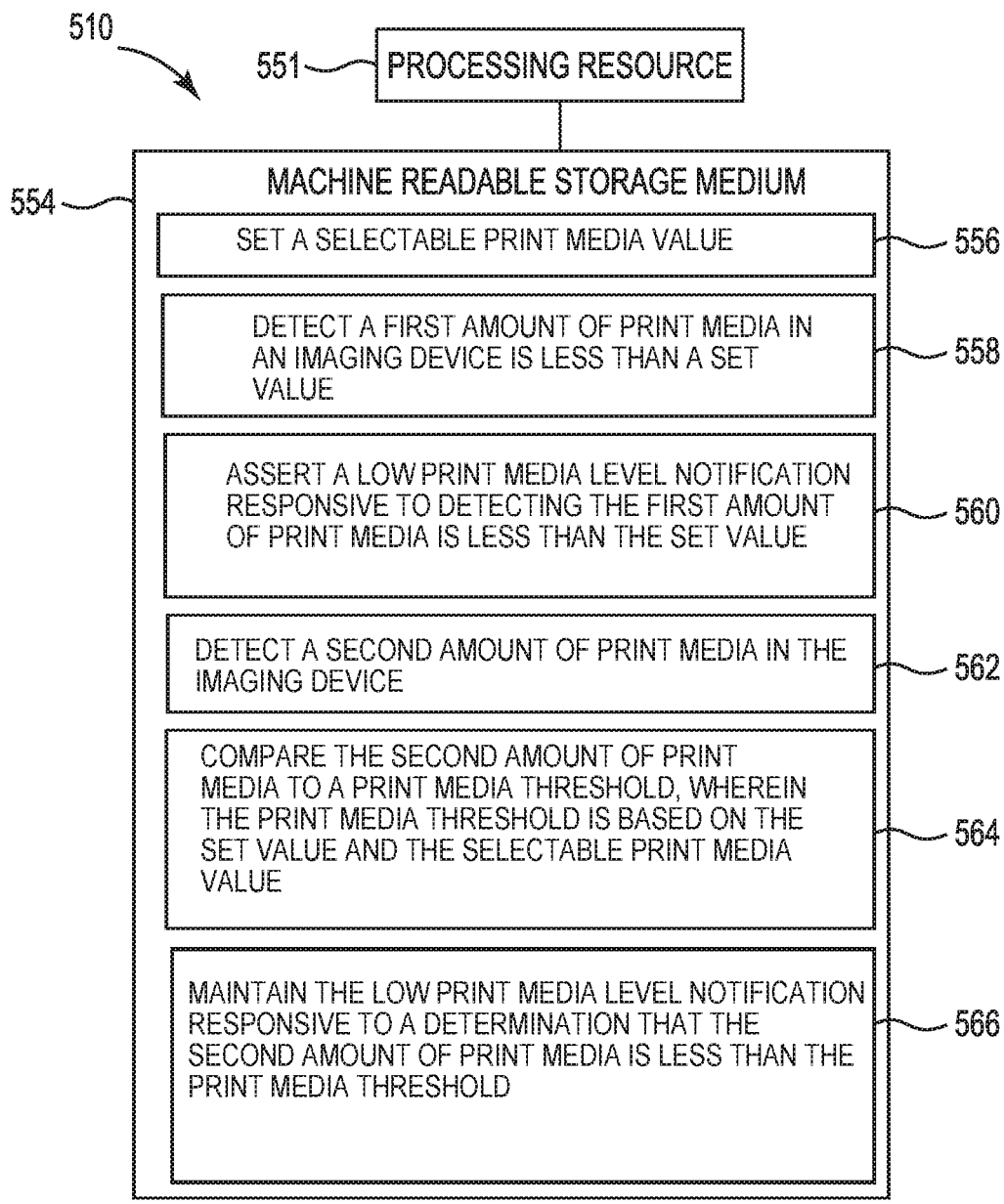
FIG. 5 is a block diagram of an example of a controller suitable with print media thresholds, according to an example.
Figure 6:
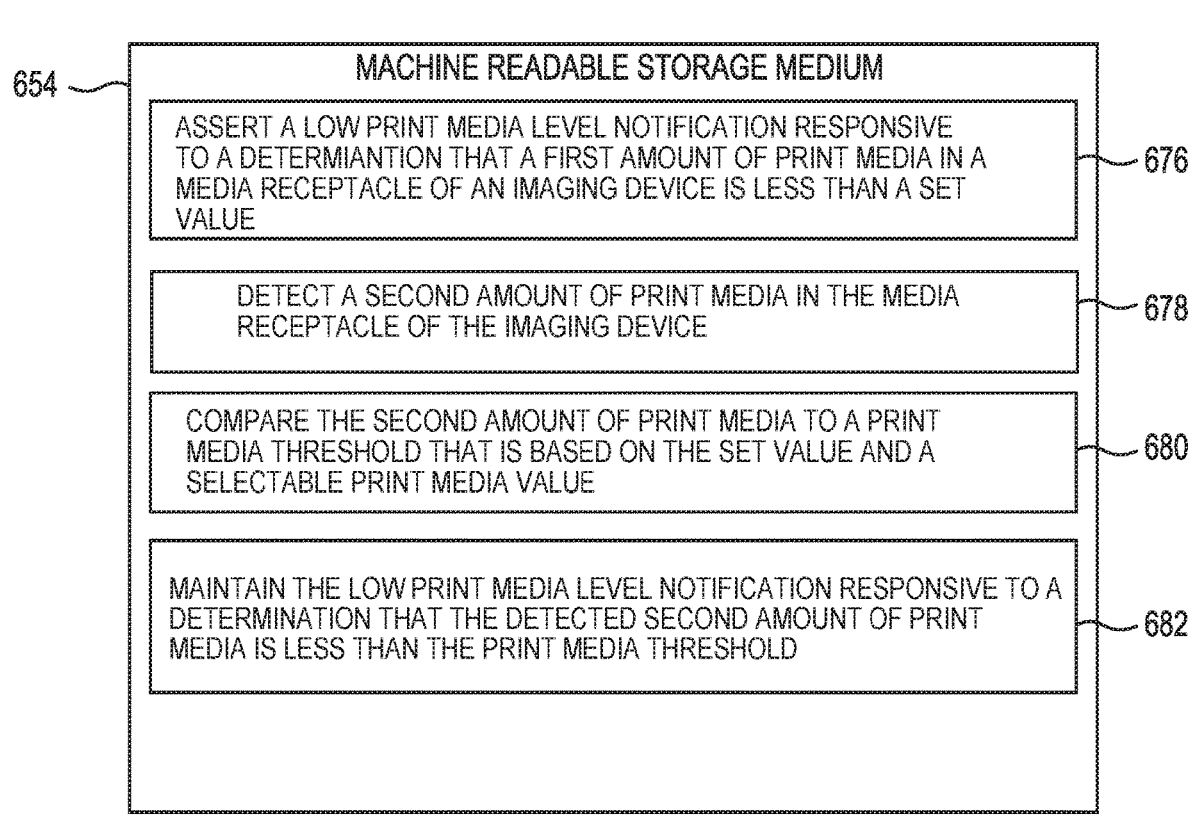
FIG. 6 is a block diagram of an example of a machine readable storage medium suitable with print media thresholds, according to an example.

FIG. 5 is a block diagram of an example of a controller 510 suitable with print media thresholds, according to an example. Controller 510 can include a processing resource 551 and a machine-readable storage medium 554 (e.g., machine-readable medium 654 as illustrated in FIG. 6), respectively. Although the following descriptions refer to an individual processing resource and an individual machine-readable storage medium, the descriptions can also apply to a system with multiple processing resources and multiple machine-readable storage mediums. In such examples, the instructions can be distributed across multiple machine-readable storage mediums and the instructions can be distributed across multiple processing resources. Put another way, the instructions can be stored across multiple machine-readable storage mediums and executed across multiple processing resources, such as in a distributed computing environment.

Processing resource 551 can be a central processing unit (CPU), microprocessor, and/or other hardware device suitable for retrieval and execution of instructions stored in machine-readable storage medium 554. In the particular example shown in FIG. 5, processing resource 551 can receive, determine, and/or send instructions 556, 558, 560, 562, 564, and 566. As an alternative or in addition to retrieving and executing instructions, processing resource 551 can include an electronic circuit comprising an electronic component for performing the operations of the instructions in machine-readable storage medium 554. With respect to the executable instruction representations or boxes described and shown herein, it should be understood that part or all of the executable instructions and/or electronic circuits included within one box can be included in a different box shown in the figures or in a different box not shown.

Machine-readable storage medium 554 can be any electronic, magnetic, optical, or other physical storage device that stores executable instructions. Thus, machine-readable storage medium 554 can be, for example, Random Access Memory (RAM), an Electrically-Erasable Programmable Read-Only Memory (EEPROM), a storage drive, an optical disc, and the like. The executable instructions can be "installed" on the controller 510 illustrated in FIG. 5. Machine-readable storage medium 554 can be a portable, external or remote storage medium, for example, that allows the controller 510 to download the instructions from the portable/external/remote storage medium. In this situation, the executable instructions can be part of an "installation package". As described herein, machine-readable storage medium 554 can be encoded with executable instructions related to print media thresholds. In various examples, medium 554 is non-transitory machine readable medium storing instructions executable by a processing resource such as processing resource 551.

Instructions 556, when executed by processing resource 551, can cause controller 510 to set a selectable print media value, as described herein. For instance, the instructions 556 can set a print media value equal to a value selected by a user. For example, a user can select a print media value (e.g., 5 sheets) via a GUI or other input device (e.g., button) of an imaging device and/or via a GUI or other input device (e.g., mouse, keyboard, etc.) of another computing component coupled in a wired or wireless manner with the imaging device. In this manner, print media thresholds can be customized by a given user and/or application.

Instructions 558, when executed by processing resource 551, can cause controller 510 to detect a first amount of print media in an imaging device is less than a set value (e.g., a low level threshold), as described herein. For instance, the controller 510 can detect via a sensor a first amount of print media at a first time. For example, an IR sensor can use an intensity of a signal reflected from a stack of print media in a media receptacle of the imaging device to detect an amount of print media (e.g., an estimated total number of sheets actually located in the media receptacle) at a first time. As mentioned other types of sensors and/or types of detection of an amount of print media are possible.

In some examples, the controller 510 can include instructions when executed by processing resource 551 to determine whether the first amount of print media is less than a set value, as described herein. For instance, when the first amount of print media has a value (e.g., 8 sheets) then it can be determined that the first amount of print media is less than a value (e.g., 10 sheets) of a set value. While the above example references 10 sheets, it is understood that a set value can be set at any suitable numeric value such as 1, 5, 10, 15, 25, 100, 200, 500, and/or 1000 sheets (or other units) of print media. That is while various examples references "sheets" of print media it is understood that the print media can be present in units and/or configurations other than in a sheet.

Instructions 560, when executed by processing resource 551, can cause controller 510 to assert a low print media level notification responsive to detecting the first amount of print media is less than the set value, as described herein. Instructions 562, when executed by processing resource 551, can cause controller 510 to detect a second amount of print media in the imaging device. For instance, the controller 510 can detect via a sensor, such as those describe herein, a second amount of print media at a second time. The second time can be a time subsequent to the first time at which the first amount of print media is detected. The second amount of print media can be detected in a same or different manner than the first amount of print media.

In some examples, the instructions can include instructions to detect an amount of print media (e.g., a first amount of print media) in an imaging device responsive to receipt of a print job. However, the disclosure is not so limited. An amount of print media can be detected in advance of receipt of a print job or another type communication, responsive to receipt of a print job or another type communication, during generation by the imaging device of a print job or during response to another type of communication, and/or subsequent to completion of a print job or transmitting a response to another type of communication, among other possibilities. For instance, in some examples, the instructions can include instruction to detect an amount of print media in an imaging device following generation of each sheet of print media included in a print job.

Instructions 564, when executed by processing resource 551, can cause controller 510 to compare the second amount of print media to a print media threshold. As mentioned, a print media threshold can be based on a set value and a selectable print media value. For example, a print media threshold (e.g., 15 sheets) can be equal to a sum of a set value (e.g., 10 sheets) and a selectable print media value (e.g., 5 sheets), among other possibilities such as those where the print media threshold is not equal to a sum of a set value and a selectable media value.

Instructions 566, when executed by processing resource 551, can cause controller 510 to maintain the low print media level notification responsive to a determination that the second amount of print media is less than the print media threshold, as described herein. The instructions to maintain the low print media level notification can includes instructions to assert, de-assert, or maintain a signal to maintain the low print media level notification. As used herein, assert refers to generation or other application of an electrical signal. As used herein, de-assert refers to ceasing generation or otherwise removal of application of a signal. As used herein, maintain a signal refers to continued generation or application of an existing signal. Regardless, maintaining a low print media level notification can mitigate/negate "false" normal print media level notifications.

FIG. 6 is a block diagram of an example of a machine readable storage medium suitable with print media thresholds, according to an example. Medium 654 is analogous to or similar to medium 554. For instance, the medium 654 can include instructions that are executable by a processing resource to perform functions related to print media thresholds.

In various examples, the medium 654 can include instructions 676, when executed by a processing resource, that can assert a low print media level notification responsive to determination that a first amount of print media in a media receptacle of an imaging device is less than a set value, as described herein. Asserting a low print media level notification can include providing a low print media level notification via a GUI of the imaging device and/or via a GUI of a computing component (e.g., a monitor) coupled to the imaging device.

In various examples, the medium 654 can include instructions 678, when executed by a processing resource, that can detect a second amount of print media in the media receptacle of the imaging device, as described herein. The medium 654 can include instructions 680, when executed by a processing resource, that can compare the detected second amount of print media to a print media threshold that is based on a set value and a selectable print media value, as described herein.

In various examples, the medium 654 can include instructions 682, when executed by a processing resource, that can maintain the low print media level notification responsive to a determination that the detected second amount of print media is less than the print media threshold, as described herein. For instance, instructions 682 can maintain a low print media level notification responsive to a determination that a detected second amount of print media is greater than the set value, but less than the print media threshold. That is, instructions 682 can maintain a low print media level notification responsive to a determination that a second amount of print media or other amount of print media is less than a print media threshold.

In some examples the instructions can include instructions to maintain an estimated amount of print media included in the imaging device. For instance, the instructions can maintain an estimated amount of print media at a first amount of print media or other amount of print media.

In some examples the instructions can de-assert a low print media level notification. For instance, the instructions can de-assert a low print media level notification responsive to a determination that a detected amount of print media (e.g., a second amount of print media) is greater than a print media threshold. Such de-assertion of a low print media level notification can cause a GUI or other output mechanism to cease (not) display a low print media level notification.

In some examples, the instructions can include instructions to update an estimated amount of print media in an imaging device such as to a more recently detected amount of print media. For instance, an estimated amount of print media can be updated to a second amount of print media responsive to a determination that the second amount of print media is greater than the print media threshold, among other possibilities. The updated estimated amount of print media can be displayed via a GUI of an imaging device and/or via a GUI of a computing component (e.g., a monitor) coupled to the imaging device. Responsive to display of an updated estimated amount of print media a notification can be displayed. For instance, a normal print media level notification can be asserted or otherwise caused to be displayed responsive to a determination that a detected amount of print media (such as the second amount of print media) is greater than a print media threshold.

In some examples, a value of a selectable print media value can be greater than an amount of variance of the sensor to avoid "false" notification fluctuations. As mentioned, a sensor can have a variance of +/−a given number of sheets due to signal oscillations and/or other factors. For example, a sensor can have signal variance of +/−3 sheets relative to an actual amount of print media (e.g., 12 sheets). In such examples, the sensor can provide a detected amount of print media of 9, 10, 11, 12, 13, 14, and/or 15 sheets at a given time, even though the actual amount of print media is 12 sheets. Thus, a selectable print media value can be 4 or greater in such examples, though other values based on an amount of variance are possible. Such examples can be employed when a variance of a sensor is known (or approximated) or can otherwise employed.

However, in some examples, the instructions can include instructions to set a selectable print media value at a value relative to a set value. For instance, a selectable value can be set at a value of from about 10, about 20, about 30, about 50, about 75, about 80, about 100 or other percent of a set value. For example, the selectable print media value can have a value that is about 30 percent or greater of the set value, among other possibilities. Such examples can be employed when a variance of a sensor is unknown or can otherwise employed.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 221 can reference element "21" in FIG. 2, and a similar element can be referenced as 321 in FIG. 3. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense.

What is claimed:

1. A non-transitory machine readable medium storing instructions executable by a processing resource to:
   assert a low print media level notification responsive to a determination that a first amount of print media in a media receptacle of an imaging device is less than a predetermined set value;
   detect a second amount of print media in the media receptacle of the imaging device;
   compare the second amount of print media to a print media threshold that is based on the predetermined set value and a selectable print media value that is equal to a non-zero quantity of sheets of print media; and
   maintain the low print media level notification responsive to a determination that the detected second amount of print media is greater than the predetermined set value but less than the print media threshold.

2. The non-transitory machine readable medium of claim 1, further comprising instructions to maintain an estimated amount of print media included in the imaging device as the first amount of print media.

3. The non-transitory machine readable medium of claim 1, further comprising instructions to de-assert the low print media level notification responsive to the determination that the detected second amount of print media is greater than the print media threshold.

4. The non-transitory machine readable medium of claim 3, further comprising instructions responsive to the determination that the detected second amount of print media is greater than the print media threshold to:
   update an estimated amount of print media in an imaging device to the second amount of print media; and
   assert a normal print media level notification.

5. The non-transitory machine readable medium of claim 1, wherein a value of the selectable print media value is greater than an amount of variance of a sensor.

6. A controller including a processing resource and a non-transitory machine readable medium storing instructions executable by the processing resource to:
   set a selectable print media value that is equal to a non-zero quantity of sheets of print media;
   detect a first amount of print media in an imaging device is less than a predetermined set value;
   assert a low print media level notification responsive to detecting the first amount of print media is less than the predetermined set value;
   detect a second amount of print media in the imaging device;
   compare the second amount of print media to a print media threshold, wherein the print media threshold is based on the predetermined set value and the selectable print media value; and
   maintain the low print media level notification responsive to a determination that the second amount of print media is greater than the predetermined set value but less than the print media threshold.

7. The controller of claim 6, wherein the predetermined set value is a non-selectable value.

8. The controller of claim 6, wherein the selectable print media value has a value that is 30 percent or greater of the predetermined set value.

9. The controller of claim 6, further comprising instructions to detect the first amount of print media in the imaging device responsive to receipt of a print job.

10. The controller of claim 9, further comprising instructions to detect an amount of print media in the imaging device following generation of each sheet of print media included in a print job.

11. The controller of claim 6, wherein the instructions to maintain include instructions to assert, de-assert, or maintain a signal to maintain the low print media level notification.

* * * * *